Nov. 30, 1971  R. D. GERARD  3,623,362
FREE-FALL CURRENT METER
Filed Feb. 11, 1970  2 Sheets-Sheet 1
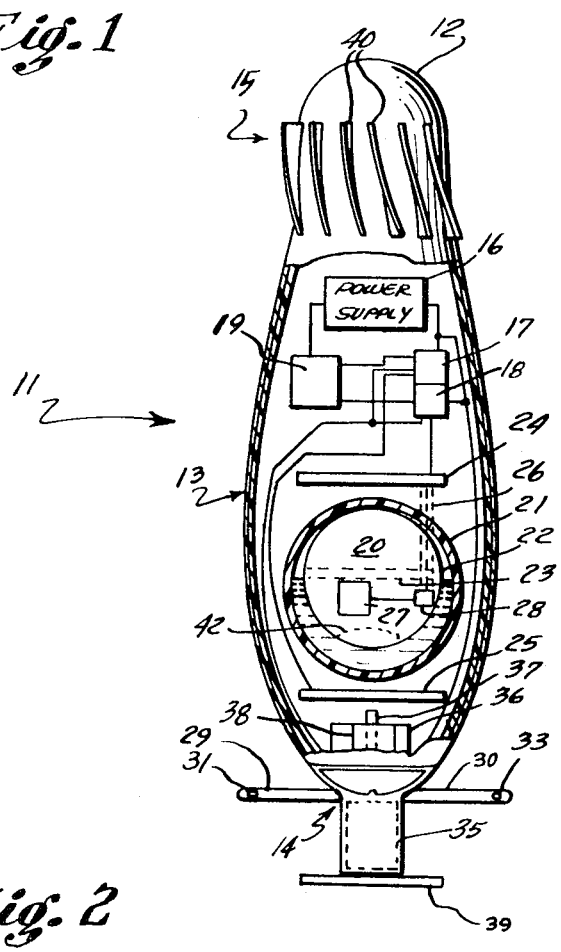
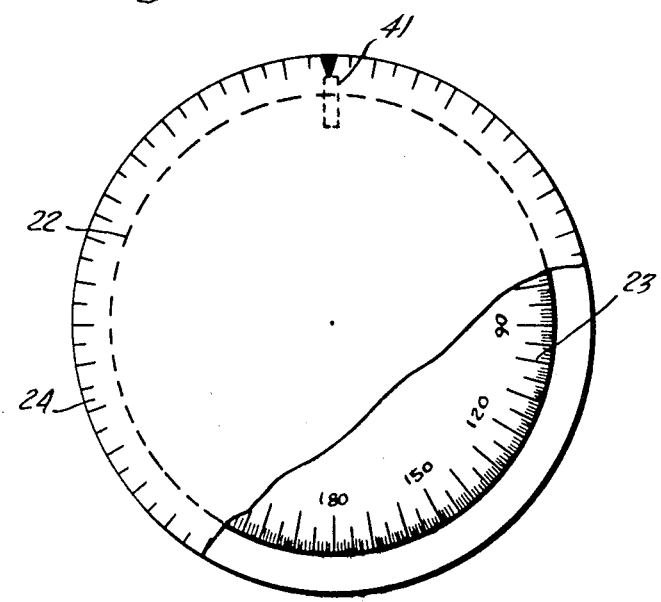
Robert D. Gerard
INVENTOR.
BY C. E. Vaulrain Jr., agent
Attorneys

United States Patent Office 3,623,362
Patented Nov. 30, 1971

3,623,362
FREE-FALL CURRENT METER
Robert Daniel Gerard, Palisades, N.Y., assignor to the
United States of America as represented by the Secretary of the Navy
Filed Feb. 11, 1970, Ser. No. 10,328
Int. Cl. G01c 23/00; G01p 5/08
U.S. Cl. 73—189
9 Claims

ABSTRACT OF THE DISCLOSURE

A current measuring device for the continuous recording of current during the free fall and rise of an instrument is provided. The instrument contains recording and direction indicating equipment in its central portion, fins at its tail end to impart rotation and remotely positioned pressure probes at the ballasted nose end for sensing pressure differences indicative of the current encountered on both descent and ascent.

---

The invention described herein may be manufactured and used by or for the Government of the United States of America for governmental purposes without the payment of any royalties thereon or therefor.

This invention concerns a fluid current measuring device and, more particularly, such a device for recording current during both free fall of the instrument and its return to the surface.

The types of current measurement instruments available today operate either on Eulerian methods of measuring flow past a fixed point or Langrangian methods of measuring the trajectories of tagged water particles or drifting objects whose drift is plotted with respect to time. In both methods, measurements are taken a distinct levels only; and, to obtain a composite cross section of current structure, many such levels must be occupied by the instruments. The prior devices thus are either fixedly secured to a float or an anchor or measure current by the amount of their physical displacement because of it. Some devices indicate current by the inclination of an elongate body tethered at one end. Consequently, no known devices available today provide a constant sensing of current throughout the column of water traversed during descent, let alone ascent.

The present invention avoids the complex, cumbersome prior methods and apparatus for accomplishing current measurement by employing an aerodynamically contoured body having rotation-imparting fins and pressure-sensitive transducers preferably positioned back to back on transversely extending probes in which, due to rotation of the device, maximum and minimum strains are sensed in respective areas where the probe is moving into the current as against moving with the current.

Accordingly, it is an object of the present invention to provide a free-fall instrument adapted to sense current throughout the ascent or descent of the device.

Another object of the invention is to provide a free-fall current measuring device wherein current measurement is obtained through detecting maximum and minimum pressures induced in moving objects by the current.

A further object of the invention is to provide a free-fall current measuring device which is compact, recoverable and has a minimum of components for sensing current-induced pressures throughout both its descent in a negatively buoyant state and its ascent in a positively buoyant state.

Other objects, advantages and novel features of the invention will become apparent from the following detailed description thereof when considered in conjunction with the accompanying drawings in which like numerals represent like parts throughout and wherein:

FIG. 1 is a side elevation partly in section showing the recording and direction indicating components of the free-fall current measuring device;

FIG. 2 is an enlarged plan view partly cut away of the direction indicating means of the device;

Figure 3:
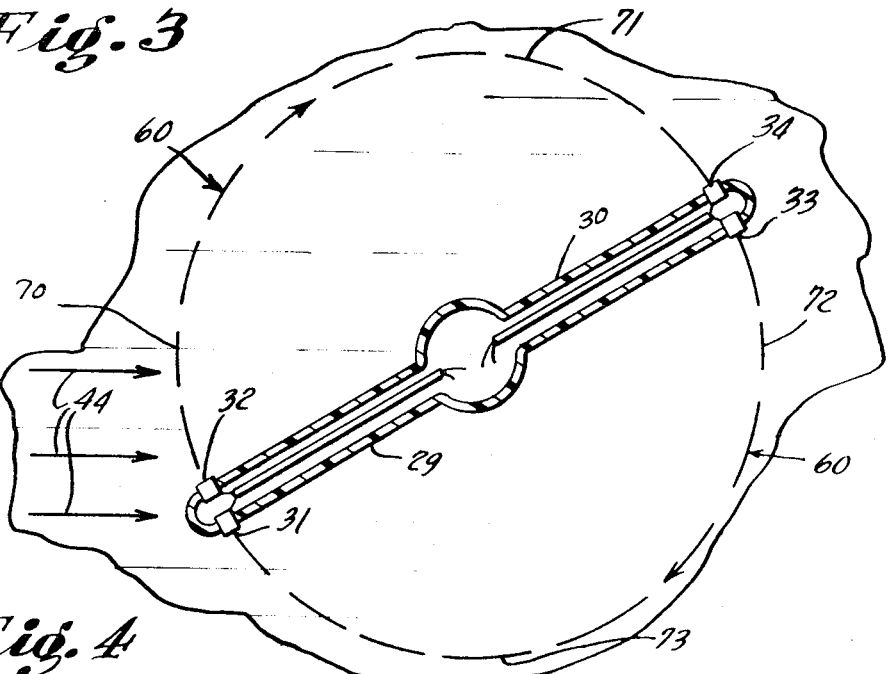
FIG. 3 is an enlarged sectional plan view of the pressure-sensing elements of the device mounted on arms extending therefrom.

Referring now to FIG. 1, there is shown a free-fall measuring device 11 which includes a housing 12 divided into three major sections; an instrument carrying central section 13; a pressure-sensing, ballasted nose section 14; and a rotation producing tail section 15. The housing preferably is made of fiber glass or suitable synthetic material and has mounted in the central portion 13 a power supply 16, pressure-sensing components 17 and 18, a recorder 19 and direction sensing and indicating means 20. The components are secured by conventional means, not shown, to the housing with the direction means 20 centrally positioned and including a watertight sphere 21 in which is floated a second sphere 22 having a magnet and magnetic compass card 23 attached thereto. Direction indication is provided by directional reading means 24 and 25 and a light beam 26 which is continuously energized by a battery 27 and emanates from a lamp 28. Beam 26 passes through a slit in compass card 23 at the North heading thereon and energizes a photocell or other conventional photosensitive means disposed at a lubber line, not shown, in fixed directional reading means 24 and 25 whenever the lubber line in either directional means moves across the light beam.

The nose section 14 includes at least a pair of laterally extending arms 29 and 30, each arm preferably having a pair of probe means such as transducers 31, 32 and 33, 34 positioned back to back thereon. A releasable ballast 35 also is included, the ballast being released by conventional, spring-loaded or explosive-actuated release means, not shown. Nose section 14 also includes electrically operated means 36 for extending an antenna rod 37 when the device has ascended to the surface. A radio transmitter 38 further is included in the nose section and is adapted to be set in operation in a conventional manner, not shown, when the device has achieved a buoyant condition at the surface after having completed a cycle of current measurement. A means for resisting penetration into soft sediments such as a slightly deformable disc 39 may be attached to ballast 35 where appreciable penetration is anticipated.

Tail section 15 is provided with a plurality of fins 40 configured so as to impart a desired rate of rotation, in relation to the weight and shape of housing 12, to the device. Fins 40 preferably are sufficient in number and surface area and have a selected configuration so as to provide a drop rate of approximately six feet per second in combination with a rotation rate of approximately one revolution per second.

FIG. 2 illustrates one means of direction indication which may be used with the device. A magnetic compass preferably is employed having a slit 41 in the compass card itself, this slit directing light which emantes from light source 28 below the compass card vertically upward to the detecting means 24 or 25. In the simplified direction means shown, the sphere 22 carrying the compass card 23 also carries the power source such as battery 27 and the light 28 sealed within the sphere. When the housing is inverted sphere 22 will remain floated due to a weight 42 in the bottom of the fluid well, thereby positioning the compass card and light in a reverse attitude to that shown in FIG. 1 for recording during ascent. A more sophisticated direction indicating means such as that shown in my U.S. Patent No. 3,567,327, entitled "Magnetic Compass Direction Indicating System," issued March 2, 1971, may be substituted for that shown herein.

FIG. 3 is an enlarged view of the current sensing means, illustrating transducers 31 and 32 in opposed positions at the outer end of probe means 29 and transducers 33 and 34 in similar positions at the outer end of probe means 30. These transducers may be of any make so long as they are adapted to the environment and are sensitive to the light pressures encountered. When the probes in FIG. 3 are rotated clockwise as shown by arrows 60 and are in the positions shown, the pressure on the exposed surface of transducer 32 will be the greatest of all transducers and, of course, greater than that of transducers 31 since transducer 32 is moving into a current 44 in the position shown while transducer 31 senses back pressure on the remote side of probe 29. On probe 30, transducer 34 will sense a lower pressure than transducer 33 since 33 is advancing into the water and transducer 34 is on the trailing side of the arm and, therefore, records back pressure. Also, transducer 34 is moving in the general direction of current 44 so that this transducer should record the lowest pressure of all transducers under the conditions shown.

Figure 4:
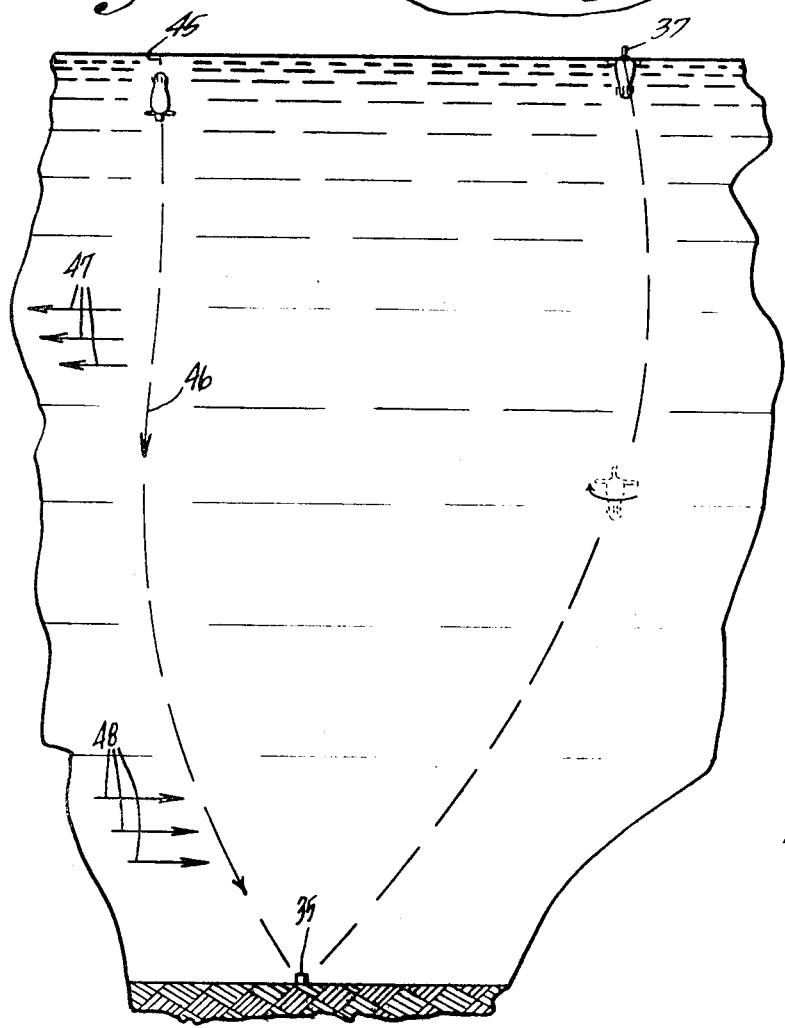
FIG. 4 is a diagrammatic presentation of a typical sampling of currents in the descent and ascent of the device.

FIG. 4 illustrates the path of the device in one cycle of measurement of current conditions throughout the depth of a body of water. The descent is initiated at the surface at a position indicated at 45, and fall occurs substantially along path 46 in which displacement is produced by various currents encountered such as indicated by arrows 47 and 48. The device on reaching the bottom releases ballast 35 and, thereafter, due to prearranged buoyancy means, not shown, becomes inverted so that the nose section 14 now is pointed upward, placing fins 40 in a downward position to provide rotation during the ascent of the device. It is noted that in the configuration shown the fins produce counterclockwise rotation during descent and clockwise rotation during ascent. On reaching the surface, radio beacon antenna 37 is deployed and transmitter 38 actuated so that selective signals may be transmitted, enabling the device to be recovered.

In operation, the compass sphere, including the battery and light, is connected and then sealed and positioned in spherical chamber 21. Recorder 19 is set in operation and transmitter 38 is armed for operation upon release of ballast 35. With all other internal components ready, the device is dropped and proceeds along a path indicated generally by numeral 46 to the bottom. The device may encounter current in one direction as indicated at 47 during one area in its descent and current in another direction as indicated at 48 during another area in its descent. The device is so weighted that the combined weight of the housing, components and ballast preferably causes free fall at a drop rate of approximately six feet per second, with the fins 40 so configured as to provide a preferred rotation rate of housing 12 at approximately one revolution per second. Transducers 31 through 34 are disposed from housing 12 a selected distance so as to be positioned in an area relatively free of turbulence caused by the device. The transducers rotate with the rotating instrument housing and sense varying pressures depending upon the direction and velocity of current encountered during travel of the device. Thus, with the transducers rotating clockwise as shown in FIG. 3, maximum pressures are recorded when the probes move in direct opposition to the direction of flow of currents such as 47 or 48 and minimum pressure will be recorded when the probes move in the same direction as and with these currents.

At least two transducers, preferably positioned back to back, are desired so that temperature and other effects may be minimized. The leading transducer, considering this transducer in an initial position indicated at 70 in FIG. 3 as moving transverse to the direction of current, would in this position record an intermediate pressure; in a position displaced 90° and indicated at 71, the transducer would record a minimum pressure; in a third position displaced 90° and indicated at 72, the transducer would again record an intermediate pressure; and, in a fourth position with the transducer moving directly into the current as indicated at 73, the transducer would record a maximum pressure. The trace of these recordings essentially is a sine wave signal indicative of current conditions at the time of recording. That is, the pressures sensed by transducers 32 and 33 under the conditions shown in FIG. 3 will vary from a high at point 73 to a low at point 71, with substantially equal intermediate pressures at points 70 and 72 until the measuring device has reached equilibrium with the current. At equilibrium, the signals from opposed rotating sensors will be equal in all phases of rotation and will have an intermediate or baseline magnitude corresponding to that of rotation in still water. Since the maximum and minimum pressures are not sharply defined, a plot against time of these pressures is essentially sinusoidal in form using the intermediate pressure as the reference or baseline pressure. The peaks of such a sinusoidal record are then related to compass heading through information received from direction reading means 24 and 25. If desired, combinations of transducers, such as the four shown in FIGS. 1 and 3, would read differential forces or forces out of phase with one another which could be suitably amplified in a conventional manner, not shown, and compared. The four-transducer combination shown in FIG. 3 thus would provide traces of the high and low pressures sensed by the opposing of transducers 32 and 33 which differ 180° due to the angular relationship of the transducers on probes 29 and 30. Traces are not obtained from transducers 31 and 34, their function in one particular arrangement being to collect in situ data for compensating for temperature and other effects.

The transducers may be any of several available commercial beam-type, strain-gauge transducers similar to the Endevco Corporation miniature beam-type, strain-gauge transducer. The signal provided during a five minute fall of the device would thus have 300 cycles of current measurement. These cycles, of course, would be related to time so that at any predicted position of the device the time it reaches such a position, when referred to the sine signal, would provide pressure readings representative of current conditions at that time and position.

The device may be further sophisticated by superimposing upon the amplitude signal from the transducer a direction signal picked off at each rotation as a point on housing 12 passes magnetic North or any desired true or magnetic bearing. This signal when superimposed on either a single sine wave or a multiple sine wave signal provides a dual indication of current direction and velocity. Additional recordings of time, temperature and pressure may be made by recorder 19, although time alone is sufficient to provide depth information based upon a known terminal velocity.

Upon reaching a preselected depth, a release means such as a fracturable pressure-sensitive wafer, not shown, may be inserted to allow ambient pressure to actuate a conventional release mechanism such as a spring release, not shown, to release ballast 35. The radio beacon antenna 37 also is operable at this time, actuating the antenna deploying mechanism and deploying antenna 37 for signal transmission upon reaching the surface. The device is buoyant in a nose-up attitude with ballast 35 removed, causing it to be inverted after ballast release and to rise to the surface again at a selected linear velocity. With the nose upward during ascent, fins 40 produce rotation at substantially the same rate as during descent and recorder 19 continues to record current characteristics. Upon reaching the surface, the instrument is recovered through monitoring the frequency of its radio beacon. Careful navigation and positioning of the point of deployment of the device and the point of recovery provide confirmatory information regarding the total mass transport, i.e. the sum of the currents, over the depth traversed.

There is thus provided a means and method for measuring current which is not limited to measurements at particular depths but encompasses a constant sensing of currents throughout the fall of the device. The continuous data on current shear and cross-sectional current structure throughout the entire ocean column or any selected segment thereof is valuable in itself as an instantaneous measurement of ambient conditions. The device may be used without special equipment with the exception of necessary conventional navigation gear on shipboard and is relatively inexpensive to build and to use.

Obviously many modifications and variations of the present invention are possible in the light of the above teachings.

The present embodiment may be modified further within the concept of the invention by replacing disc 39 with flat surfaces which extend longitudinally from ballast 35, such surfaces upon impact being projected laterally to further add resistance to penetration. These surfaces would be actuated by the mass of the device in a conventional manner and concurrently could effect disengagement of the ballast from the device. In instrument section 13, the power supply, recorder and compass could all be contained within a single glass sphere formed by two hemispherical sections clamped together. Such an arrangement would permit use of the device in depths corresponding to hydrostatic pressures of up to 15,000 p.s.i. while achieving the optimum buoyancy-to-volume ratio. Additional buoyancy could be provided by another hollow glass sphere dipsosed within the instrument section or a hemisphere of syntactic foam disposed in the nose section.

What is claimed is:

1. A sensing device for measuring and recording currents throughout the depths of a body of water comprising:
   a hydrodynamically contoured housing having a central cavity, a nose section and a tail section;
   a power supply and a recording means mounted in said central cavity;
   a releasable ballast means and at least two pressure sensing transducer means mounted on and deployed a selected distance from said housing at said nose section, said transducer means facing in opposite directions and substantially planar with the vertical centerline of said device;
   means connecting said recording means to said transducer means and said power supply to record pressures sensed by said transducer means;
   a plurality of fins mounted exteriorly on said housing at said tail section, said fins configured to produce a selected rotation rate of said device during both free fall and free ascent thereof; and
   said device selectively weighted to fall at a selected rate with said ballast attached so that said transducer means moving against the water will sense pressures related to currents in said body of water, said pressures indicative of the relative velocity of current flow at all depths transversed by said device.

2. The device of claim 1 wherein said device is selectively weighted to ascend in inverted attitude at substantially said selected rate after said ballast has been released rendering the device operative during ascent as it is during descent.

3. The device of claim 2 and further including direction indicating means mounted in said housing for indicating and recording magnetic north upon each revolution of said device about its vertical centerline,
   said direction indicating means including a mangetic compass, a lamp mounted thereon and dual light sensing elements oppositely disposed thereabout for sensing and indicating azimuthal direction when said device is in a normal attitude and in an inverted attitude,
   said direction indicating means connected to said recording means to provide an azimuthal reference for relating recorded pressures to compass direction.

4. The device of claim 3 wherein said transducers are mounted on at least two probes extending outward from said housing a selected distance and disposing said transducers in an area which is substantially free of turbulence caused by said housing.

5. The device of claim 4 wherein said transducers are four in number mounted back to back in pairs on said probes so as to substantially reduce temperature effects,
   said transducers providing, in zones of shear, a sine wave signal which indicates a maximum strain in that quadrant of rotation wherein the probe is moving substantially transverse to the current.

6. The device of claim 5 wherein said transducers are four in number mounted back to back in pairs near the remote ends of a pair of probes,
   said pairs of transducers sensing pressures out of phase with one another and providing dual sine wave signals which are indicative of current velocity,
   said recording means providing a signal indicative of magnetic north superimposed at selected intervals on said sine wave signals.

7. The device of claim 6 wherein said transducers are high-sensitivity, beam-type strain-gauge transducers adapted to operate on a horizontal plane.

8. The method of obtaining continuous A-C signal data on currents throughout an entire water column or selected portion thereof comprising the steps of:
   continuously sensing perssures along a helical path through said column by transducer means disposed substantially transverse to said path, said transducer means regularly sweeping through layers of water and obtaining substantially duplicate coherent out of phase information on water motion in each layer; and
   recording signals from said transducer means, said recorded signals being sinusoidal in form, indicating maximum strain when said transducer means are moving substantially in direct opposition to a current and minimum strain when said transducer means are moving substantially in the direction of the current.

9. The method as defined in claim 8 and further including the step of superimposing on said recorded signals indicative of direction of current flow at selected intervals of time.

References Cited

UNITED STATES PATENTS

| | | | |
|---|---|---|---|
| 2,688,250 | 9/1954 | Roberts | 73—189 |
| 2,913,900 | 11/1959 | Andrews | 73—189 |
| 3,174,336 | 3/1965 | Zrubek | 73—189 |
| 3,273,393 | 9/1966 | Spark | 73—170 X |
| 3,512,408 | 5/1970 | Douglass, Jr. | 73—170 |

FOREIGN PATENTS

| | | | |
|---|---|---|---|
| 961,641 | 11/1949 | France | 73—189 |

JAMES J. GILL, Primary Examiner

J. P. BEAUCHAMP, Assistant Examiner